United States Patent
Kang et al.

(10) Patent No.: US 11,511,994 B2
(45) Date of Patent: Nov. 29, 2022

(54) CARBON NANOTUBES, METHOD OF MANUFACTURING SAME, AND POSITIVE ELECTRODE FOR PRIMARY BATTERY COMPRISING SAME

(71) Applicant: LG CHEM, LTD., Seoul (KR)

(72) Inventors: Kyung Yeon Kang, Daejeon (KR); Hyun Joon Kang, Daejeon (KR); Ki Soo Lee, Daejeon (KR); Soon Ki Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 3 days.

(21) Appl. No.: 17/258,306

(22) PCT Filed: Jul. 26, 2019

(86) PCT No.: PCT/KR2019/009300
§ 371 (c)(1),
(2) Date: Jan. 6, 2021

(87) PCT Pub. No.: WO2020/022822
PCT Pub. Date: Jan. 30, 2020

(65) Prior Publication Data
US 2021/0139331 A1 May 13, 2021

(30) Foreign Application Priority Data
Jul. 27, 2018 (KR) .................. 10-2018-0088010

(51) Int. Cl.
*C01B 32/158* (2017.01)
*B01J 23/648* (2006.01)
(Continued)

(52) U.S. Cl.
CPC ........... *C01B 32/158* (2017.08); *B01J 23/648* (2013.01); *B01J 23/652* (2013.01); *B01J 37/08* (2013.01);
(Continued)

(58) Field of Classification Search
CPC ...... B01J 21/185; B01J 23/648; B01J 23/652; B01J 35/0033; B01J 35/1019;
(Continued)

(56) References Cited

U.S. PATENT DOCUMENTS 8,926,933 B2 * 1/2015 Zhang ................ B29C 48/0019
977/843
8,992,878 B2 * 3/2015 Nishino ................... B01J 23/74
977/752
(Continued)

FOREIGN PATENT DOCUMENTS

EP 3349280 A1 7/2018
EP 3831773 A1 6/2021
(Continued)

OTHER PUBLICATIONS

English translation of PCT/KR2019/009300 Written Opinion. (Year: 2019).*
(Continued)

*Primary Examiner* — Patricia L. Hailey
(74) *Attorney, Agent, or Firm* — Dentons US LLP

(57) ABSTRACT

The present invention relates to carbon nanotubes having a pore volume of 0.94 cm$^3$/g or more, and being an entangled type, a method of manufacturing the same, and a positive electrode for a primary battery which comprises the same.

14 Claims, 1 Drawing Sheet

(51) Int. Cl.
*B01J 23/652* (2006.01)
*B01J 37/08* (2006.01)
*H01M 4/08* (2006.01)
*H01M 4/96* (2006.01)
*H01M 4/02* (2006.01)

(52) U.S. Cl.
CPC .............. *H01M 4/08* (2013.01); *H01M 4/96* (2013.01); *H01M 2004/028* (2013.01)

(58) Field of Classification Search
CPC ..... B01J 35/1042; B01J 37/08; C01B 32/158; C01B 32/162; C01B 32/164; H01M 4/08; H01M 4/96; H01M 2004/028
USPC ............... 429/532; 423/445 R, 447.1, 447.2; 977/742, 842; 502/101, 182
See application file for complete search history.

(56) References Cited

U.S. PATENT DOCUMENTS

| | | | |
|---|---|---|---|
| 2002/0165091 A1* | 11/2002 | Resasco | D01F 9/1278 502/313 |
| 2004/0265210 A1* | 12/2004 | Shinohara | B01J 29/88 423/447.3 |
| 2007/0092431 A1* | 4/2007 | Resasco | D01F 9/1278 427/430.1 |
| 2010/0240529 A1* | 9/2010 | Balzano | C01B 32/162 977/750 |
| 2014/0309105 A1 | 10/2014 | Kang et al. | |
| 2015/0273441 A1 | 10/2015 | Kim et al. | |
| 2015/0274529 A1 | 10/2015 | Kim et al. | |
| 2015/0298974 A1 | 10/2015 | Kim et al. | |
| 2016/0248087 A1 | 8/2016 | Kim et al. | |
| 2018/0162734 A1 | 6/2018 | Kang et al. | |
| 2018/0175439 A1 | 6/2018 | Kang et al. | |
| 2018/0219212 A1* | 8/2018 | Seol | H01M 4/364 |
| 2020/0126684 A1* | 4/2020 | Kim | D01F 9/127 |
| 2021/0139331 A1 | 5/2021 | Kang et al. | |

FOREIGN PATENT DOCUMENTS

| | | | | |
|---|---|---|---|---|
| JP | 2009-078235 A | 4/2009 | | |
| JP | 2013-108201 A | 6/2013 | | |
| JP | 2014-533200 A | 12/2014 | | |
| JP | 2016-535716 A | 11/2016 | | |
| JP | 2018-513083 A | 5/2018 | | |
| KR | 10-2011-0044367 A | 4/2011 | | |
| KR | 10-2013-0081921 A | 7/2013 | | |
| KR | 2013 0081921 | * | 7/2013 | ............ B01J 23/755 |
| KR | 10-2015-0007267 A | 1/2015 | | |
| KR | 2015 0007267 | * | 1/2015 | .............. B01J 23/16 |
| KR | 10-1508101 B | 4/2015 | | |
| KR | 10 1525879 | * | 6/2015 | ............ H01M 12/00 |
| KR | 10-1525879 B | 6/2015 | | |
| KR | 10-1605621 B1 | 3/2016 | | |
| KR | 10-2016-0125030 A | 10/2016 | | |
| KR | 10-2017-0031061 A | 3/2017 | | |
| KR | 10-2017-0037454 A | 4/2017 | | |

OTHER PUBLICATIONS

Osler et al., "Synthesis and evaluation of carbon nanotubes composite adsorbent for CO2 capture: a comparative study of CO2 adsorption capacity of single-walled and multi-walled carbon nanotubes", International Journal of Coal Science & Technology, 2017, vol. 4, No. 1, pp. 41-49 (Feb. 17, 2017).
Jun Jie Niu et al., "An approach to carbon nanotubes with high surface area and large pore volume", Microporous and Mesoporous Materials, Elsevier, 2007, vol. 100, No. 1-3, pp. 1-5, XP005878650.
Jiang Q. et al., "A study of activated carbon nanotubes as electrochemical super capacitors electrode materials", Materials Letters, Elsevier, 2002, vol. 57, No. 4, pp. 988-991, XP004392532.

* cited by examiner

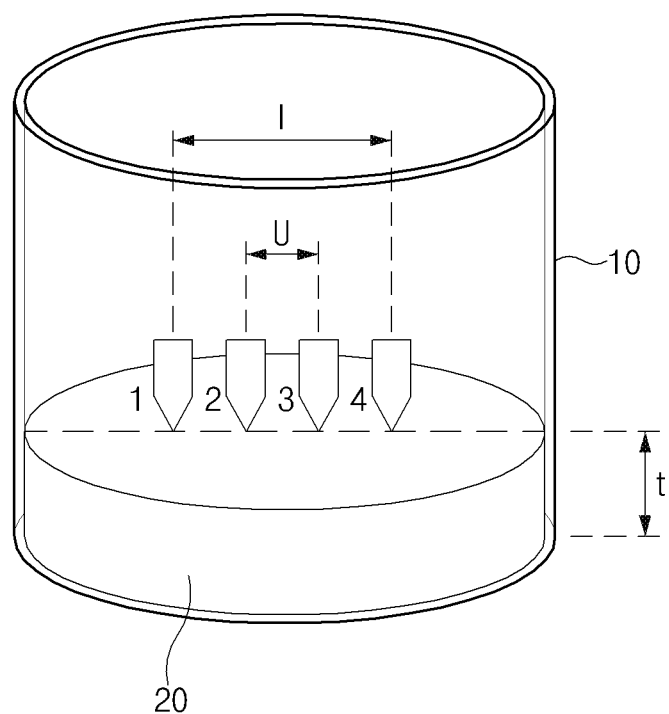

CARBON NANOTUBES, METHOD OF MANUFACTURING SAME, AND POSITIVE ELECTRODE FOR PRIMARY BATTERY COMPRISING SAME

The present application is a National Phase entry pursuant to 35 U.S.C. § 371 of International Application No. PCT/KR2019/009300 filed on Jul. 26, 2019, and claims priority to and the benefit of Korean Patent Application No. 10-2018-0088010, filed on Jul. 27, 2018, the disclosures of which are incorporated herein by reference in their entirety.

FIELD

The present invention relates to carbon nanotubes, a method of manufacturing the same, and a positive electrode for a primary battery which includes the carbon nanotubes, and more particularly, to carbon nanotubes in which the volume and shape of pores are adjusted, a method of manufacturing the same, and a positive electrode for a primary battery which includes the carbon nanotubes.

BACKGROUND

Generally, carbon nanotubes refer to cylindrical carbon tubes having a diameter of several to tens of nanometers and a length that is several to tens of times greater than the diameter. These carbon nanotubes consist of layers of aligned carbon atoms.

Carbon nanotubes may generally be manufactured by arc discharge, laser evaporation, chemical vapor synthesis, or the like. Among these, arc discharge and laser evaporation are not suitable for the mass-production of carbon nanotubes, and excessive arc production costs and excessive laser equipment purchase costs cause reduced economic efficiency.

Carbon nanotubes exhibit non-conductive, conductive or semiconducting properties according to unique chirality, have greater tensile strength than steel due to strong covalent bonds of carbon atoms, have excellent flexibility, elasticity, and the like, and are also chemically stable.

Due to these excellent physical properties, carbon nanotubes may be used in positive electrodes for primary batteries, electromagnetic shielding agents, field emission displays, and the like. To be applied to positive electrodes or the like of primary batteries, carbon nanotubes are required to secure a pore volume capable of sufficiently carrying sulfur or a catalyst and should not be structurally deformed. However, the development of carbon nanotubes with these characteristics is inadequate.

SUMMARY

An object of the present invention is to provide entangled-type carbon nanotubes having a large pore volume.

Another object of the present invention is to provide a positive electrode for a primary battery which has a large pore volume and a large average pore size.

Still another object of the present invention is to provide a primary battery with enhanced discharge characteristics.

According to an aspect of the present invention, there are provided carbon nanotubes having a pore volume of 0.94 $cm^3/g$ or more, and being an entangled type.

The present invention also provides a method of manufacturing carbon nanotubes, including: allowing a mixture including a main catalyst precursor and a co-catalyst precursor to be supported on $\gamma$-$Al_2O_3$ to prepare an active carrier; drying the active carrier through multi-stage drying including vacuum drying; heat-treating the dried active carrier to prepare a supported catalyst; and manufacturing carbon nanotubes in the presence of the supported catalyst.

The present invention also provides a positive electrode for a primary battery which includes: a positive electrode active material including carbon nanotubes having a pore volume of 0.94 $cm^3/g$ or more, and being an entangled type; and a binder.

The present invention also provides a primary battery including the above-described positive electrode for a primary battery.

Carbon nanotubes according to an embodiment of the present invention have a large pore volume. Thus, when the carbon nanotubes are used as a positive electrode for a primary battery, the carbon nanotubes exhibit an enhanced supporting capacity to carry sulfur or a catalyst, and thus can significantly enhance discharge characteristics of a primary battery.

In addition, carbon nanotubes according to an embodiment of the present invention are an entangled type and thus swelling thereof hardly occurs even when brought into contact with an organic solvent. Accordingly, when carbon nanotubes according to an embodiment of the present invention are used as a positive electrode for a primary battery, structural deformation is minimized even during battery operation, resulting in significantly enhanced battery durability.

BRIEF DESCRIPTION OF THE DRAWING

The FIGURE is a view illustrating a method of measuring volume resistivity.

DETAILED DESCRIPTION

Hereinafter, the present invention will be described in more detail to aid in understanding of the present invention.

The terms or words used in the present specification and claims should not be construed as being limited to ordinary or dictionary meanings and should be construed as meanings and concepts consistent with the spirit of the present invention based on a principle that an inventor can appropriately define concepts of terms to explain the invention of the inventor in the best way.

The term "carbon nanotubes" as used herein refers to a secondary structural form in which a plurality of carbon nanotube units are completely or partially entangled with each other, and the carbon nanotube unit is a graphite sheet in the form of a cylinder having a nano-sized diameter and has an $sp^2$ bonding structure. In this regard, the graphite sheet may exhibit characteristics of a conductor or a semiconductor according to the rolling angle and structure. The carbon nanotube units may be classified into single-walled carbon nanotubes (SWCNTs), double-walled carbon nanotubes (DWCNTs), and multi-walled carbon nanotubes (MWCNTs) according to the number of bonds forming the walls, and the thinner the walls, the lower the resistance. In the present invention, the carbon nanotubes may include one or more selected from SWCNT units, DWCNT units, and MWCNT units.

In the present invention, the carbon nanotubes are "pristine carbon nanotubes".

Unless otherwise mentioned herein, the term "bundle type" as used herein refers to the arrangement of a plurality of carbon nanotube units such that longitudinal axes of the units are parallel to each other in substantially the same orientation, or a secondary structural form twisted or entangled into a bundle or rope form after the arrangement.

As used herein, the term "entangled type" refers to a form in which a plurality of carbon nanotube units are entangled with each other without a certain form such as a bundle or a rope, unless otherwise mentioned herein.

In the present invention, the pore volume of carbon nanotubes and a positive electrode for a primary battery may be measured in accordance with ASTM D4641.

In addition, in the present invention, the pore volume of carbon nanotubes and a positive electrode for a primary battery may be measured by measuring $N_2$ absorption and desorption amounts at a liquid nitrogen temperature (−196° C.) while varying a relative pressure (P/PO) from 0.01 to 0.99 using BELSORP-mini II (product name, manufacturer: BEL Japan), and then measuring a pore volume at a desorption level using the BJH formula.

In the present invention, volume resistivity may be measured using MCP-PD51 available from N&H Technology GmbH. Specifically, 0.5 g of carbon nanotubes may be put in a cylindrical sample cell having a diameter of 1 cm at 25° C., and then the pressure may be sequentially raised to 4 kN (12.73 MPa), 8 kN (25.46 MPa), 12 kN (38.20 MPa), 16 kN (50.93 MPa), and 20 kN (63.66 MPa) using MCP-PD51 available from N&H Technology GmbH, and the volume resistivity may be measured when the pressure is at 20 kN (63.66 MPa).

Volume resistivity($\Omega \cdot cm$)=$R(\Omega) \cdot RCF \cdot t$(cm)

R ($\Omega$)=U/I

U (V): Potential difference

I (A): Current

RCF: Correction factor

In the present invention, the specific surface area of carbon nanotubes may be measured by a BET method. Specifically, the specific surface area may be calculated from the amount of nitrogen gas adsorbed at a liquid nitrogen temperature (77 K) using BELSORP-mini II (product name, manufacturer: BEL Japan).

In the present invention, the bulk density of carbon nanotubes may be measured in accordance with ASTM B329-06.

In the present invention, an average pore size may be measured as a pore size at which a value, which is obtained by differentiating, by the log value of a pore size (dp) according to pressure, a pore volume according to pressure which is measured at a desorption level using the BJH formula while varying a relative pressure (P/PO) from 0.01 to 0.99 at a liquid nitrogen temperature (−196° C.) using BELSORP-mini II (product name, manufacturer: BEL Japan), is maximum.

In the present invention, the purity of carbon nanotubes may be measured in accordance with ASTM D1506-15.

1. Carbon Nanotubes

Carbon nanotubes according to an embodiment of the present invention have a pore volume of 0.94 cm$^3$/g or more and are an entangled type.

The pore volume of the carbon nanotubes is preferably 0.95 cm$^3$/g or more, more preferably from 0.95 cm$^3$/g to 2.0 cm$^3$/g. In a case in which the pore volume satisfies the above-described conditions, when the carbon nanotubes are used as a positive electrode for a primary battery, the carbon nanotubes exhibit an enhanced ability to carry sulfur or a catalyst, and thus may significantly enhance battery capacity characteristics. When the pore volume is less than 0.94 cm$^3$/g, the ability of the carbon nanotubes to carry sulfur or a catalyst is not enhanced compared to existing carbon nanotubes, and thus battery capacity characteristics are not enhanced.

Since the carbon nanotubes are an entangled type, swelling thereof hardly occurs even when brought into contact with an organic solvent. In addition, there is almost no change in pore volume even during a pulverization process. Accordingly, the carbon nanotubes may be used as a positive electrode for a primary battery, and structural deformation thereof is minimized even during battery operation, resulting in significantly enhanced battery durability.

However, in the case of bundle type carbon nanotubes having a pore volume of 0.94 cm$^3$/g or more, the carbon nanotubes are likely to swell when brought into contact with an organic solvent. Thus, when the carbon nanotubes are used as a positive electrode for a primary battery, structural deformation thereof due to an electrolytic solution is likely to occur so that battery durability may be significantly reduced. In addition, when the carbon nanotubes are subjected to pulverization in order to be processed into a positive electrode for a primary battery, the pore volume is significantly decreased, and thus the ability thereof to carry sulfur or a catalyst may be lowered and accordingly, the discharge characteristics of a primary battery may also be deteriorated.

When the pore volume and bulk density of the carbon nanotubes are identical to each other, the larger the specific surface area, the lower the volume resistivity, and thus conductivity may be enhanced. Due to the enhanced conductivity, the discharge characteristics of a primary battery may also be enhanced. The carbon nanotubes may have a specific surface area of 200 m$^2$/g to 300 m$^2$/g, preferably 210 m$^2$/g to 275 m$^2$/g, and more preferably 220 m$^2$/g to 260 m$^2$/g. When the specific surface area of the carbon nanotubes is within the above range, sulfur or a catalytically active material may be uniformly dispersed, and thus an electrical network thereof with the carbon nanotubes may be further facilitated.

The carbon nanotubes may have a bulk density of 60 kg/m$^3$ to 100 kg/m$^3$, preferably 65 kg/m$^3$ to 95 kg/m$^3$. When the bulk density of the carbon nanotubes is within the above range, the density of the carbon nanotubes is appropriately maintained, and thus sulfur or a catalyst may be uniformly supported in a bundle of the carbon nanotubes. In addition, as the bulk density of the carbon nanotubes decreases, the distribution and structure of carbon nanotube units become looser and accordingly, the electrical network of the carbon nanotubes may be further enhanced.

The carbon nanotubes may have a volume resistivity of 0.0187 $\Omega \cdot cm$ or less, preferably 0.0185 $\Omega \cdot cm$ or less, under conditions of 25° C. and 20 kN. When the volume resistivity of the carbon nanotubes is within the above range, the conductivity of the carbon nanotubes is enhanced, and thus discharge characteristics of a primary battery may be enhanced.

The carbon nanotubes may have a purity of 80% or more, preferably 90% or more. When the purity of the carbon nanotubes is within the above range, the possibility of residual catalyst components causing a side reaction by participating in an oxidation or reduction reaction at an operating voltage of a lithium sulfur battery or a fuel battery may be decreased.

2. Method of Manufacturing Carbon Nanotubes

A method of manufacturing carbon nanotubes, according to another embodiment of the present invention includes: 1) allowing a mixture including a main catalyst precursor and a co-catalyst precursor to be supported on γ-Al$_2$O$_3$ to prepare an active carrier; 2) drying the active carrier through multi-stage drying including vacuum drying; 3) heat-treating the dried active carrier to prepare a supported catalyst; and 4) manufacturing carbon nanotubes in the presence of the supported catalyst.

Hereinafter, the method of manufacturing carbon nanotubes, according to another embodiment of the present invention will be described in detail.

Process 1)

First, a mixture including a main catalyst precursor and a co-catalyst precursor is supported on-$Al_2O_3$ to prepare an active carrier.

To uniformly enable the main catalyst precursor and the co-catalyst precursor to be supported on-$Al_2O_3$, the mixture may further include a solvent, and the main catalyst precursor and the co-catalyst precursor may be in a state of being dissolved in a solvent. The solvent may be one or more selected from the group consisting of water, methanol, and ethanol. Preferably, water is used.

$\gamma$-$Al_2O_3$ has high porosity and a spinel structure, and thus a main catalyst and a co-catalyst may be irregularly arranged on $\gamma$-$Al_2O_3$, and carbon nanotubes grown from an irregularly arranged main catalyst may be manufactured in an entangled form.

The main catalyst may be one or more selected from the group consisting of cobalt, iron, nickel, manganese, and chromium. Preferably, cobalt is used.

The main catalyst precursor may be one or more selected from the group consisting of nitrates, sulfates, carbonates, and acetates of the main catalyst, and preferably, nitrates of the main catalyst are used.

The main catalyst precursor may be one or more selected from the group consisting of $Co(NO_3)_2$, $Co(NO_3)_2.6H_2O$, $Co_2(CO)_8$, $Co_2(CO)_6[HC\equiv C(C(CH_3)_3)]$, $Co(CH_3CO_2)_2$, $Fe(NO_3)_3$, $Fe(NO_3)_2.nH_2O$, $Fe(CH_3CO_2)_2$, $Ni(NO_3)_2$, $Ni(NO_3)_2.6H_2O$, $Mn(NO_3)_2$, $Mn(NO_3)_2.6H_2O$, $Mn(CH_3CO_2)_2.n(H_2O)$, and $Mn(CO)_5Br$. Preferably, $Co(NO_3)_2.6H_2O$, $Fe(NO_3)_2.nH_2O$ and $Ni(NO_3)_2.6H_2O$ are used.

The co-catalyst, which is used to enhance the dispersibility of the main catalyst, may be one or more selected from the group consisting of vanadium and molybdenum.

The co-catalyst precursor may be one or more selected from the group consisting of $NH_4VO_3$, $NaVO_3$, $V_2O_5$, $V(C_5H_7O_2)_3$, and $(NH_4)_6Mo_7O_{24}.4H_2O$. Preferably, one or more selected from the group consisting of $NH_4VO_3$ and $(NH_4)_6Mo_7O_{24}.4H_2O$ are used.

When the mixture includes two or more co-catalyst precursors, i.e., both a vanadium precursor and a molybdenum precursor, a molar ratio of the sum of vanadium and molybdenum to vanadium may range from 1:0.45 to 1:0.95 or 1:0.5 to 1:0.9, preferably 1:0.5 to 1:0.9. When the molar ratio is within the above range, carbon nanotubes with a stably maintained structure and a desired pore volume may be manufactured.

The mixture may include the main catalyst precursor and the co-catalyst precursor such that a molar ratio of main catalyst to co-catalyst ranges from 1:0.01 to 1:0.5, 1:0.1 to 1:0.4, or 1:0.1 to 1:0.25, preferably 1:0.1 to 1:0.25. When the molar ratio is within the above range, the dispersibility of the main catalyst may be enhanced, and carbon nanotubes with a desired pore volume may be manufactured.

The mixture may further include an organic acid which inhibits the precipitation of the main catalyst precursor and the co-catalyst precursor.

The organic acid may be one or more selected from the group consisting of citric acid, tartaric acid, fumaric acid, malic acid, acetic acid, butyric acid, palmitic acid, and oxalic acid, and preferably, citric acid is used.

The mixture may include the organic acid and the co-catalyst precursor at a molar ratio of 1:1 to 1:20, 1:2 to 1:10, or 1:3 to 1:6, preferably 1:3 to 1:6. When the molar ratio is within the above range, it is possible to prepare a transparent catalytic metal solution during catalyst preparation and accordingly, it is possible to prepare a catalyst with suppressed formation into fine powder during impregnation.

The method of manufacturing carbon nanotubes, according to an embodiment of the present invention may further include aging after process 1).

The aging process may be performed for 1 minute to 60 minutes or 10 minutes to 50 minutes, preferably 10 minutes to 50 minutes. When the aging time is within the above range, the main catalyst precursor and the co-catalyst precursor may be sufficiently supported on $\gamma$-$Al_2O_3$. In addition, air bubbles present in the carrier may be removed to a maximum extent such that the main catalyst precursor and the co-catalyst precursor may be sufficiently supported in micropores of the carrier.

Process 2)

Subsequently, the active carrier is dried through multi-stage drying including vacuum drying.

The multi-stage drying may mean that two or more drying processes including vacuum drying are performed. Specifically, the multi-stage drying may mean drying processes including ambient pressure drying and vacuum drying, or two or more vacuum drying processes alone.

The pore volume of entangled-type carbon nanotubes is affected by the uniformity and mean particle size of the main catalyst. The pore volume may be enlarged only if the main catalyst is very small and uniform, but it is very difficult to prepare a main catalyst to be very small and uniform in size. However, when the multi-stage drying is performed, not only the main catalyst precursor present on the active carrier, that is, the coordination compound of the main catalyst, is easily decomposed, but the main catalyst precursor may also be converted into a main catalyst oxide having a very small size and a uniform mean particle diameter. In addition, a main catalyst derived from the main catalyst oxide is present in the state of being very small in size and having a uniform mean particle diameter in the supported catalyst, and carbon nanotube units grown from such a main catalyst have a very small average diameter such that the amount thereof present per unit area is significantly increased. These carbon nanotubes exhibit an increased pore volume and enhanced conductivity. In addition, when these carbon nanotubes are used as a positive electrode for a primary battery, the carbon nanotubes exhibit an increased ability to carry sulfur or a catalyst and enhanced dispersibility and structural deformation is minimized during battery operation, resulting in significantly enhanced battery durability.

In addition, the vacuum drying facilitates the decomposition of the main catalyst precursor, thereby enhancing productivity of the supported catalyst.

The vacuum drying may be performed at 80° C. to 300° C. or 120° C. to 250° C., and it is preferable that the vacuum drying is performed at 120° C. to 250° C. When the vacuum drying temperature is within the above range, the main catalyst precursor, i.e., a coordination compound of the main catalyst, is easily decomposed, and thus a main catalyst oxide may be formed and energy consumption may be minimized.

The vacuum drying may be performed at 1 mbar to 200 mbar or 30 mbar to 150 mbar, and it is preferable that the vacuum drying is performed at 30 mbar to 150 mbar. When the above-described condition is satisfied, the main catalyst precursor, i.e., a coordination compound of the metal catalyst, is instantaneously decomposed and discharged, and thus a main catalyst oxide may be more easily formed under vacuum conditions, and energy consumption may be minimized.

The vacuum drying may be performed for 10 minutes to 3 hours or 10 minutes to 2 hours, and it is preferable that the vacuum drying is performed for 10 minutes to 2 hours. When the above-described condition is satisfied, the main catalyst precursor may be easily decomposed to be converted into a main catalyst oxide, and energy consumption may be minimized.

Meanwhile, when the multi-stage drying processes include ambient pressure drying and vacuum drying, the ambient pressure drying may be performed before the vacuum drying and may enable the removal of a solvent that may be present in the active carrier.

The ambient pressure drying may be performed at 80° C. to 160° C. or 100° C. to 140° C., and it is preferable that the ambient pressure drying is performed at 100° C. to 140° C. When the above-described condition is satisfied, a solvent present in the active carrier may be sufficiently removed and energy consumption may be minimized.

The ambient pressure drying may be performed at 900 mbar to 1,100 mbar, preferably at 950 mbar to 1,050 mbar. When the above-described condition is satisfied, a solvent present in the active carrier may be sufficiently removed and energy consumption may be minimized.

The ambient pressure drying may be performed for 1 hour to 12 hours or preferably for 3 hours to 9 hours. When the above-described condition is satisfied, a solvent present in the active carrier may be sufficiently removed and energy consumption may be minimized.

Meanwhile, when the multi-stage drying processes include two or more vacuum drying processes alone, the vacuum drying processes may include two or more vacuum drying processes performed at different temperatures, more particularly primary vacuum drying performed at a first temperature and secondary vacuum drying performed at a second temperature that is higher than the first temperature.

The primary vacuum drying may enable the removal of a solvent that may be present in the active carrier.

The first temperature may range from 80° C. to 160° C., preferably 100° C. to 140° C. When the above-described condition is satisfied, a solvent present in the active carrier may be sufficiently removed and energy consumption may be minimized.

The primary vacuum drying may be performed for 1 hour to 12 hours or preferably for 3 hours to 9 hours. When the above-described condition is satisfied, a solvent present in the active carrier may be sufficiently removed and energy consumption may be minimized.

The primary vacuum drying may be performed at 1 mbar to 200 mbar, 1 mbar to 150 mbar, or 80 mbar to 150 mbar, and it is preferable that the primary vacuum drying is performed at 80 mbar to 150 mbar. When the above-described condition is satisfied, a solvent present in the active carrier may be sufficiently removed and energy consumption may be minimized.

The description of the secondary vacuum drying is the same as described above with regard to the vacuum drying.

The second temperature may range from 175° C. to 300° C., preferably 180° C. to 280° C. When the vacuum drying temperature is within the above range, the main catalyst precursor, i.e., a coordination compound of the main catalyst, is easily decomposed to thus form a main catalyst oxide, and energy consumption may be minimized.

The secondary vacuum drying may be performed at 1 mbar to 200 mbar, 1 mbar to 150 mbar, or 1 mbar to 70 mbar, and it is more preferable that the secondary vacuum drying is performed at 1 mbar to 70 mbar. When the above-described condition is satisfied, the main catalyst precursor, i.e., a coordination compound of the metal catalyst, is instantaneously decomposed and discharged, and thus a main catalyst oxide may be more easily formed under vacuum conditions, and energy consumption may be minimized.

The secondary vacuum drying may be performed for 10 minutes to 3 hours or 10 minutes to 2 hours, and it is preferable that the secondary vacuum drying is performed for 10 minutes to 2 hours. When the above-described condition is satisfied, the main catalyst precursor may be easily decomposed to be converted into a main catalyst oxide, and energy consumption may be minimized.

Process 3)

Subsequently, the dried active carrier is heat-treated to prepare a supported catalyst.

When the heat treatment process is performed, a supported catalyst in which the main catalyst and the co-catalyst are present in the state of being coated on the surface and in micropores of $\gamma$-$Al_2O_3$ is prepared.

The heat treatment process may be performed at 600° C. to 800° C. or 620° C. to 750° C., and it is preferable that the heat treatment process is performed at 620° C. to 750° C. When the above-described condition is satisfied, a supported catalyst in which the main catalyst and the co-catalyst are in the state of being uniformly coated on the surface and in micropores of $\gamma$-$Al_2O_3$ may be prepared, and energy consumption may be minimized.

The heat treatment process may be performed for 1 hour to 12 hours or 2 hours to 8 hours, and it is preferable that the heat treatment process is performed for 2 hours to 8 hours. When the above-described time condition is satisfied, a supported catalyst in which the catalyst precursor is present in the state of being uniformly coated on the surface and in micropores of $\gamma$-$Al_2O_3$ may be prepared.

Process 4)

Subsequently, carbon nanotubes are manufactured in the presence of the supported catalyst.

Specifically, carbon nanotubes may be manufactured by bringing the supported catalyst into contact with a carbon-based compound, particularly by chemical vapor synthesis.

The manufacturing of the carbon nanotubes will be described in detail. First, the supported catalyst may be put in a horizontal fixed bed reactor or a fluidized bed reactor. Subsequently, carbon nanotubes may be grown by chemical vapor synthesis through the decomposition of the carbon-based compound, which is in a gaseous state, or a gas mixture of the carbon-based compound, which is in a gaseous state, a reducing gas (e.g., hydrogen or the like), and a carrier gas (e.g., nitrogen or the like) at a thermal decomposition temperature or higher of the carbon-based compound, which is in a gaseous state, or at a melting point or lower of a catalyst supported on the supported catalyst.

The carbon nanotubes manufactured by chemical vapor synthesis may have a crystal growth direction that is almost parallel to axes thereof and may have high graphite structural crystallinity in a longitudinal direction thereof. As a result, carbon nanotubes with high conductivity and strength, units of which have a small diameter, may be manufactured.

The chemical vapor synthesis may be performed at 600° C. to 800° C. or 650° C. to 750° C., and it is preferable that the chemical vapor synthesis is performed at 650° C. to 750° C. When the above-described temperature condition is satisfied, carbon nanotubes may be manufactured while minimizing the generation of amorphous carbon.

As a heat source for the above reaction, induction heating, radiant heat, laser, IR, microwaves, plasma, surface plasmon heating, or the like may be used.

In addition, the carbon-based compound is not particularly limited as long as it is capable of supplying carbon and being present in a gaseous state at a temperature of 300° C. or higher.

The carbon-based compound may be a carbon-based compound with 6 carbon atoms or less, and may be one or more selected from the group consisting of carbon monoxide, methane, ethane, ethylene, ethanol, acetylene, propane, propylene, butane, butadiene, pentane, pentene, cyclopentadiene, hexane, cyclohexane, benzene, and toluene.

After the growth of carbon nanotubes by the above-described reaction, a cooling process for more regularly aligning the carbon nanotubes may further be performed optionally. Specifically, the cooling process may be performed using natural cooling, a cooler, or the like according to the removal of the heat source.

3. Positive Electrode for Primary Battery

A positive electrode for a primary battery, according to still another embodiment of the present invention includes a binder and a positive electrode active material including entangled-type carbon nanotubes having a pore volume of 0.94 $cm^3/g$ or more.

Since the positive electrode for a primary battery includes the above-described carbon nanotubes, the positive electrode may have excellent conductivity and a pore volume and an average pore size that are greater than those of a conventional positive electrode for a primary battery. Accordingly, the positive electrode for a primary battery may exhibit a significantly enhanced ability to carry sulfur or a catalyst, and thus the discharge capacity of a primary battery including the positive electrode may be significantly enhanced. In addition, since the above-described carbon nanotubes are an entangled type, structural deformation thereof due to an electrolytic solution may be minimized. Accordingly, a primary battery including the positive electrode may exhibit enhanced durability, and thus lifespan characteristics thereof may be significantly enhanced. In addition, when the primary battery is a lithium-thionyl chloride battery, LiCl generated during battery operation may be maximally accumulated in the positive electrode for a primary battery, thereby discharging the electric capacity of the primary battery to the maximum extent.

The positive electrode for a primary battery may have a pore volume of 0.25 $cm^3/g$ or more and an average pore size of 13.5 nm or more, preferably a pore volume of 0.25 $cm^3/g$ to 1.5 $cm^3/g$ and an average pore size of 13.5 nm to 50 nm, and more preferably a pore volume of 0.25 $cm^3/g$ to 1.1 $cm^3/g$ and an average pore size of 13.5 nm to 30 nm. When the above-described ranges are satisfied, the ability thereof to carry sulfur or a catalyst may be further enhanced, and accordingly, the discharge capacity of the primary battery may be significantly enhanced.

In the positive electrode for a primary battery, the larger the pore volume, the larger the specific surface area, and thus the specific surface area of the positive electrode which is capable of being brought into contact with sulfur may be increased and accordingly, the discharge capacity of the primary battery may be enhanced. The positive electrode for a primary battery may have a specific surface area of 60 $m^2/g$ to 200 $m^2/g$ or 70 $m^2/g$ to 180 $m^2/g$, preferably 70 $m^2/g$ to 180 $m^2/g$. When the above-described condition is satisfied, discharge capacity may be enhanced.

Meanwhile, the carbon nanotubes may have a pore volume of 0.95 $cm^3/g$ or more, more preferably 0.95 $cm^3/g$ to 2.0 $cm^3/g$. In the case in which the pore volume satisfies the above-described condition, when the carbon nanotubes are used as a positive electrode for a primary battery, the ability thereof to carry sulfur or a catalyst may be enhanced, resulting in significantly enhanced battery capacity characteristics. When the pore volume is less than 0.94 $cm^3/g$, the ability of carbon nanotubes to carry sulfur or a catalyst is not enhanced compared to existing carbon nanotubes, and thus battery capacity characteristics are not enhanced.

Since the carbon nanotubes are an entangled type, swelling thereof hardly occurs even when brought into contact with an organic solvent. In addition, there is almost no change in pore volume even during a pulverization process. Accordingly, when the carbon nanotubes are used as a positive electrode for a primary battery, structural deformation thereof is minimized even during battery operation, and thus battery durability may be significantly enhanced.

However, in the case of bundle type carbon nanotubes having a pore volume of 0.94 $cm^3/g$ or more, a significant amount of swelling occurs when brought into contact with an organic solvent. Thus, when the carbon nanotubes are used as a positive electrode for a primary battery, structural deformation thereof due to an electrolytic solution significantly occurs, and thus battery durability may be significantly reduced. In addition, when a pulverization process is performed to process carbon nanotubes into a positive electrode for a primary battery, the pore volume is significantly reduced, and thus the ability thereof to carry sulfur or a catalyst may be significantly lowered, and thus the discharge characteristics of a primary battery may also be deteriorated.

When the pore volume and bulk density of the carbon nanotubes are identical to each other, the larger the specific surface area, the lower the volume resistivity, resulting in enhanced conductivity. Due to the enhanced conductivity, the discharge characteristics of a primary battery may also be enhanced. The carbon nanotubes may have a specific surface area of 200 $m^2/g$ to 300 $m^2/g$, preferably 210 $m^2/g$ to 275 $m^2/g$, and more preferably 220 $m^2/g$ to 260 $m^2/g$. When the above-described range is satisfied, sulfur or a catalytically active material may be uniformly dispersed to facilitate an electrical network with the carbon nanotubes.

The carbon nanotubes may have a bulk density of 60 $kg/m^3$ to 100 $kg/m^3$, preferably 65 $kg/m^3$ to 95 $kg/m^3$. When the above range is satisfied, the density of the carbon nanotubes is appropriately maintained, and thus sulfur or a catalyst may be uniformly supported in a bundle of the carbon nanotubes. In addition, as the bulk density of the carbon nanotubes decreases, the distribution and structure of the carbon nanotube unit become looser, and thus an electrical network of the carbon nanotubes may be further enhanced.

The carbon nanotubes may have a volume resistivity of 0.0187 Ω·cm or less, preferably 0.0185 Ω·cm or less, under conditions of 25° C. and 20 kN. When the above-described condition is satisfied, the conductivity of the carbon nanotubes is enhanced, and thus the discharge characteristics of a primary battery may be enhanced.

The carbon nanotubes may be manufactured using the same method as described above in "2. Method of Manufacturing Carbon Nanotubes".

Meanwhile, when the primary battery is a lithium-sulfur battery, the positive electrode active material may further include sulfur.

The positive electrode active material may further include acetylene black to inhibit the formation of cracks in a positive electrode.

Meanwhile, the binder serves to fix carbon nanotubes to each other so that the positive electrode for a primary battery maintains a stable structure. Thus, structural deformation of the positive electrode for a primary battery may be minimized during primary battery operation, and the positive electrode for a primary battery may exhibit further enhanced durability. In addition, the binder may enable an increase in the number of electrical contacts between carbon nanotubes, and accordingly, the positive electrode for a primary battery may exhibit significantly enhanced conductivity.

The binder may be one or more selected from polyvinyl alcohol, polyimide, an ethylene-propylene-diene terpolymer, styrene-butadiene rubber, polyvinylidene fluoride (PVdF), polytetrafluoroethylene, a tetrafluoroethylene-hexafluoropropylene copolymer, and carboxymethyl cellulose (CMC). Among these, styrene-butadiene rubber and polytetrafluoroethylene are preferably used.

A weight ratio of the positive electrode active material to the binder may range from 1:0.3 to 1:1 or 1:0.4 to 1:0.9, preferably 1:04 to 1:0.9. When the above-described range is satisfied, the formation of cracks in a surface of the positive electrode for a primary battery may be prevented, and deterioration of the discharge characteristics of a primary battery due to a decrease in the amount of the positive electrode active material may be prevented.

Meanwhile, the positive electrode for a primary battery may further include a current collector. The current collector is not particularly limited, but may be one or more selected from the group consisting of an aluminum thin film, a stainless steel thin film, a copper thin film, and a nickel thin film.

4. Primary Battery

A primary battery of the present invention includes the above-described positive electrode for a primary battery, and further includes a negative electrode and an electrolytic solution.

The negative electrode is not particularly limited and may be a lithium thin film, and the electrolytic solution may include a lithium salt and an organic solvent. The lithium salt may be one or more selected from the group consisting of $LiAlCl_4$, LiTFSI, $LiPF_6$, $LiClO_4$, $LiAsF_6$, $LiBF_4$, $LiSbF_6$, $LiAlO_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, and $LiB(C_2O_4)_2$. The organic solvent may be one or more selected from the group consisting of thionyl chloride, tetraethylene glycol dimethyl ether, methyl acetate, ethyl acetate, γ-butyrolactone, ε-caprolactone, dibutyl ether, tetrahydrofuran, cyclohexanone, benzene, fluorobenzene, dimethyl carbonate, diethyl carbonate, methyl ethyl carbonate, ethyl methyl carbonate, ethylene carbonate, propylene carbonate, ethyl alcohol, isopropyl alcohol, dimethylformamide, and 1,3-dioxolane.

The primary battery may be a lithium-sulfur battery, a lithium-thionyl chloride battery, or a fuel battery.

Hereinafter, examples of the present invention will be described in detail in such a way that the invention may be easily carried out by one of ordinary skill in the art to which the present invention pertains. However, the present invention may be embodied in many different forms and is not limited to the examples described below.

EXAMPLES

5. Manufacture and Evaluation of Carbon Nanotubes

1) Manufacture of Carbon Nanotubes

Example 1-1

<Preparation of Supported Catalyst>

25.68 g (Co: about 88.2 mmol) of $Co(NO_3)_2.6H_2O$ as a main catalyst precursor, 1.23 g (V: about 10.5 mmol) of $NH_4VO_3$ and 0.76 g (Mo: about 4.3 mmol) of $(NH_4)_6Mo_7O_{24}.4H_2O$ as co-catalyst precursors, 0.61 g of citric acid, and 60 ml of distilled water were added to prepare a catalyst precursor solution. The entire amount of the catalyst precursor solution was supported on 20 g (about 196.15 mmol) of γ-$Al_2O_3$ (Product Name: SCCa 5/200, manufacturer: SASOL) to prepare an active carrier. The active carrier was stirred in a thermostatic bath at 80° C. for 30 minutes to prepare an aged active carrier.

The aged active carrier was then subjected to primary vacuum drying at 120° C. and 130 mbar for 60 minutes. The active carrier having undergone the primary vacuum drying was subjected to secondary vacuum drying at 200° C. and 50 mbar for 60 minutes. The active carrier having undergone the secondary vacuum drying was heat-treated at 690° C. for 120 minutes to prepare a supported catalyst.

<Manufacture of Carbon Nanotubes>

1 g of the resulting supported catalyst was mounted at the bottom of a quartz tube having an internal diameter of 55 mm located in a fluidized bed reactor. The inside of the fluidized bed reactor was heated to 690° C. at a constant rate in a nitrogen atmosphere, and then maintained. While flowing a nitrogen gas, a hydrogen gas, and an ethylene gas thereinto in a volume ratio of 2:0.5:1 at a flow rate of 2 L/min, synthesis was allowed to occur for 60 minutes, thereby completing the manufacture of carbon nanotubes (23.3 g).

Example 1-2

A supported catalyst was prepared and carbon nanotubes (19.1 g) were manufactured in the same manner as in Example 1, except that 25.68 g (Co: about 88.2 mmol) of $Co(NO_3)_2.6H_2O$ as a main catalyst precursor, 0.79 g (V: about 6.8 mmol) of $NH_4VO_3$ and 1.14 g (Mo: about 6.5 mmol) of $(NH_4)_6Mo_7O_{24}.4H_2O$ as co-catalyst precursors, 0.58 g of citric acid, and 60 ml of distilled water were added to prepare a catalyst precursor solution.

Example 1-3

A supported catalyst was prepared and carbon nanotubes (20.4 g) were manufactured in the same manner as in Example 1, except that 25.68 g (Co: about 88 mmol) of $Co(NO_3)_2.6H_2O$ as a main catalyst precursor, 0.89 g (V: about 7.6 mmol) of $NH_4VO_3$ and 0.38 g (Mo: 2.2 mmol) of $(NH_4)_6Mo_7O_{24}.4H_2O$ as co-catalyst precursors, 0.38 g of citric acid, and 60 ml of distilled water were added to prepare a catalyst precursor solution.

Example 1-4

A supported catalyst was prepared and carbon nanotubes (28 g) were manufactured in the same manner as in Example 1, except that 25.68 g (Co: about 88.2 mmol) of Co(NO$_3$)$_2$·6H$_2$O as a main catalyst precursor, 1.75 g (V: about 15 mmol) of NH$_4$VO$_3$ and 0.76 g (Mo: 4.3 mmol) of (NH$_4$)$_6$Mo$_7$O$_{24}$·4H$_2$O as co-catalyst precursors, 0.76 g of citric acid, and 60 ml of distilled water were added to prepare a catalyst precursor solution.

Example 1-5

A supported catalyst was prepared and carbon nanotubes (18 g) were manufactured in the same manner as in Example 1, except that 29.30 g (Co: about 100.7 mmol) of Co(NO$_3$)$_2$·6H$_2$O as a main catalyst precursor, 0.6 g (V: about 5.1 mmol) of NH$_4$VO$_3$ and 0.95 g (Mo: about 5.4 mmol) of (NH$_4$)$_6$Mo$_7$O$_{24}$·4H$_2$O as co-catalyst precursors, 0.45 g of citric acid, and 60 ml of distilled water were added to prepare a catalyst precursor solution.

Example 1-6

A supported catalyst was prepared and carbon nanotubes (14 g) were manufactured in the same manner as in Example 1, except that the aged active carrier was subjected to primary ambient pressure drying at 120° C. for 60 minutes, and the active carrier having undergone the primary ambient pressure drying was subjected to secondary vacuum drying at 200° C. and 50 mbar for 60 minutes.

Example 1-7

<Preparation of Supported Catalyst>
29.63 g (Co: about 101.9 mmol) of Co(NO$_3$)$_2$·6H$_2$O as a main catalyst precursor, 2.38 g (V: about 20.3 mmol) of NH$_4$VO$_3$ as a co-catalyst precursor, 1.19 g of citric acid, and 80 ml of distilled water were added to prepare a catalyst precursor solution. The entire amount of the catalyst precursor solution was supported on 20 g (about 196.15 mmol) of γ-Al$_2$O$_3$ (Product Name: SCCa 5/200, manufacturer: SASOL) to prepare an active carrier. The active carrier was stirred in a thermostatic bath at 80° C. for 30 minutes to be aged.

The aged active carrier was then subjected to primary vacuum drying at 120° C. and 130 mbar for 60 minutes. The active carrier having undergone the primary vacuum drying was subjected to secondary vacuum drying at 200° C. and 50 mbar for 60 minutes. The active carrier having undergone the secondary vacuum drying was heat-treated at 690° C. for 120 minutes to prepare a supported catalyst.

<Manufacture of Carbon Nanotubes>
1 g of the resulting supported catalyst was mounted at the bottom of a quartz tube having an internal diameter of 55 mm located in a fluidized bed reactor. The inside of the fluidized bed reactor was heated to 690° C. at a constant rate in a nitrogen atmosphere, and then maintained. While flowing a nitrogen gas, a hydrogen gas, and an ethylene gas thereinto in a volume ratio of 2:0.5:1 at a flow rate of 2 L/min, synthesis was allowed to occur for 60 minutes, thereby completing the manufacture of carbon nanotubes (27.0 g).

Comparative Example 1-1

A supported catalyst was prepared and carbon nanotubes (21.6 g) were manufactured in the same manner as in Example 1, except that the aged active carrier was subjected to primary ambient pressure drying at 120° C. for 240 minutes, and the active carrier having undergone the primary ambient pressure drying was subjected to secondary ambient pressure drying at 200° C. for 360 minutes.

Comparative Example 1-2

A supported catalyst was prepared and carbon nanotubes (20 g) were manufactured in the same manner as in Example 1, except that the aged active carrier was subjected to primary vacuum drying at 175° C. and 10 mbar for 1 hour, and secondary vacuum drying was not performed thereon.

Comparative Example 1-3

A supported catalyst was prepared and carbon nanotubes (21.3 g) were manufactured in the same manner as in Example 1, except that the aged active carrier was subjected to primary vacuum drying at 120° C. and 150 mbar for 120 minutes, and secondary vacuum drying was not performed thereon.

Comparative Example 1-4

Bundle-type carbon nanotubes (Product Name: BT1001M, manufacturer: LG Chem) were used.

Here, manufacturing conditions of Examples 1-1 to 1-7 and Comparative Examples 1-1 to 1-3 are summarized in Tables 1 and 2 below.

TABLE 1

| | | Examples | | | | | | | Comparative Examples | | |
|---|---|---|---|---|---|---|---|---|---|---|---|
| | Classification | 1-1 | 1-2 | 1-3 | 1-4 | 1-5 | 1-6 | 1-7 | 1-1 | 1-2 | 1-3 |
| Active carrier | Co(NO$_3$)$_2$·6H$_2$O (g) | 25.68 | 25.68 | 25.68 | 25.68 | 29.30 | 25.68 | 29.63 | 25.68 | 25.68 | 26.58 |
| | Co (mmol) | 88.2 | 88.2 | 88.2 | 88.2 | 100.7 | 88.2 | 101.8 | 88.2 | 88.2 | 88.2 |
| | NH$_4$VO$_3$ (g) | 1.23 | 0.79 | 0.89 | 1.75 | 0.6 | 1.23 | 2.38 | 1.23 | 1.23 | 1.23 |
| | V (mmol) | 10.5 | 6.8 | 7.6 | 15 | 5.1 | 10.5 | 20.3 | 10.5 | 10.5 | 10.5 |
| | (NH$_4$)$_6$Mo$_7$O$_{24}$·6H$_2$O (g) | 0.76 | 1.14 | 0.38 | 0.76 | 0.95 | 0.76 | — | 0.76 | 0.76 | 0.76 |
| | Mo (mmol) | 4.3 | 6.5 | 2.2 | 4.3 | 5.4 | 4.3 | — | 4.3 | 4.3 | 4.3 |
| | Citric acid (g) | 0.61 | 0.58 | 0.38 | 0.76 | 0.45 | 0.61 | 1.19 | 0.61 | 0.61 | 0.61 |
| | Distilled water (ml) | 60 | 60 | 60 | 60 | 60 | 60 | 80 | 60 | 60 | 60 |
| | Al$_2$O$_3$ (g) | 20 | 20 | 20 | 20 | 20 | 20 | 20 | 20 | 20 | 20 |
| | Al$_2$O$_3$ (mmol) | 196.15 | 196.15 | 196.15 | 196.15 | 196.15 | 196.15 | 196.15 | 196.15 | 196.15 | 196.15 |
| Composition | Al$_2$O$_3$ (mol %) | 65.6 | 65.9 | 66.7 | 64.6 | 63.7 | 65.6 | 61.6 | 65.6 | 65.6 | 65.6 |
| | Co (mol %) | 29.5 | 29.6 | 30 | 29.1 | 32.8 | 29.5 | 32 | 29.5 | 29.5 | 29.5 |
| | V (mol %) | 3.5 | 2.3 | 2.6 | 4.9 | 1.7 | 3.5 | 6.4 | 3.5 | 3.5 | 3.5 |
| | Mo (mol %) | 1.4 | 2.2 | 0.7 | 1.4 | 1.8 | 1.4 | — | 1.4 | 1.4 | 1.4 |
| | Total (mol %) | 100 | 100 | 100 | 100 | 100 | 100 | 100 | 100 | 100 | 100 |

TABLE 1-continued

| | Classification | Examples 1-1 | 1-2 | 1-3 | 1-4 | 1-5 | 1-6 | 1-7 | Comparative Examples 1-1 | 1-2 | 1-3 |
|---|---|---|---|---|---|---|---|---|---|---|---|
| Molar ratio | $Al_2O_3$ | 0.45 | 0.45 | 0.45 | 0.45 | 0.52 | 0.45 | 0.52 | 0.45 | 0.45 | 0.45 |
| | V/(Mo + V) | 0.73 | 0.54 | 0.54 | 0.79 | 0.50 | 0.73 | 1 | 0.73 | 0.73 | 0.73 |
| | (Mo + V)/Co | 0.17 | 0.15 | 0.11 | 0.22 | 0.10 | 0.17 | 0.2 | 0.17 | 0.17 | 0.17 |
| Primary ambient pressure drying | Temperature (° C.) | — | — | — | — | — | 120 | — | 120 | — | — |
| | Time (min) | — | — | — | — | — | 60 | — | 240 | — | — |
| Secondary ambient pressure drying | Temperature (° C.) | — | — | — | — | — | — | — | 200 | — | — |
| | Time (min) | — | — | — | — | — | — | — | 360 | — | — |
| Primary vacuum drying | Temperature (° C.) | 120 | 120 | 120 | 120 | 120 | — | 120 | — | 175 | 120 |
| | Pressure (mbar) | 130 | 130 | 130 | 130 | 130 | — | 130 | — | 10 | 150 |
| | Time (min) | 60 | 60 | 60 | 60 | 60 | — | 60 | — | 60 | 120 |
| Secondary vacuum drying | Temperature (° C.) | 200 | 200 | 200 | 200 | 200 | 200 | 200 | — | — | — |
| | Pressure (mbar) | 50 | 50 | 50 | 50 | 50 | 50 | 50 | — | — | — |
| | Time (min) | 60 | 60 | 60 | 60 | 60 | 60 | 60 | — | — | — |
| Heat treatment | Temperature (° C.) | 690 | 690 | 690 | 690 | 690 | 690 | 690 | 690 | 690 | 690 |
| | Time (min) | 120 | 120 | 120 | 120 | 120 | 120 | 120 | 120 | 120 | 120 |

2) Experimental Example 1-1 for Evaluating Physical Properties: Evaluation of Physical Properties of Carbon Nanotubes The manufactured carbon nanotubes were evaluated for the following items, and the results thereof are shown in Table 2 below.

(1) Secondary structural shape: observed using a scanning electron microscope at a magnification of 10,000×

(2) Pore size (cm³/g): measured in accordance with ASTM D4641.

(3) Specific surface area (m²/g): measured by a BET method using BELSORP-mini II (Product Name, manufacturer: BEL Japan).

(4) Bulk density (kg/m³): measured in accordance with ASTM B329-06.

(5) Manufacturing yield: [(Total weight of manufactured carbon nanotubes)-(Total weight of supported catalyst used)]/(Total weight of supported catalyst used)

(6) Volume resistivity (Ω·cm): measured using MCP-PD51 available from N&H Technology GmbH. Specifically, 0.5 g of CNTs was put in a cylindrical sample cell having a diameter of 1 cm at 25° C., and then the pressure was sequentially raised to 4 kN (12.73 MPa), 8 kN (25.46 MPa), 12 kN (38.20 MPa), 16 kN (50.93 MPa), and 20 kN (63.66 MPa), and the thickness of the CNTs was 1.4 mm when the pressure was at 20 kN (63.66 MPa), and volume resistivity at this time was measured.

Volume resistivity($\Omega$·cm)=$R(\Omega) \cdot RCF \cdot t$(cm)

$R (\Omega)=U/I$

U (V): Potential difference

I (A): Current

RCF: Correction factor

Meanwhile, FIG. 1 is a view illustrating a method of measuring volume resistivity.

FIG. 1 shows the measurement positions of the potential difference U and the current I, which are applied to the volume resistivity equation. The potential difference U denotes a potential difference measured between probes 1 and 4, and the current I denotes a current measured between probes 2 and 3. In addition, t denotes the thickness of CNTs put in a cylindrical sample cell under 20 kN (63.66 Mpa).

(7) Average pore size (nm): $N_2$ absorption and desorption amounts were measured at a liquid nitrogen temperature (−196° C.) while varying a relative pressure (P/PO) from 0.01 to 0.99 using BELSORP-mini II (product name, manufacturer: BEL Japan) and AFSM™, and then the pore size, at which a value obtained by differentiating, by the log value of a pore size (dp) according to pressure, a pore volume according to pressure at a desorption level using the BJH formula was maximum, was measured as an average pore size.

(8) Volume average particle size (μm): A sample was injected using Blue wave equipment from Microtrac, and was then treated at a ultrasonic intensity of 40 W for 2 minutes, followed by measurement of a volume average particle size.

TABLE 2

| Classification | Examples 1-1 | 1-2 | 1-3 | 1-4 | 1-5 | 1-6 | 1-7 | Comparative Examples 1-1 | 1-2 | 1-3 | 1-4 |
|---|---|---|---|---|---|---|---|---|---|---|---|
| Secondary structural shape | Entangled | Entangled | Entangled | Entangled | Entangled | Entangled | Entangled | Entangled | Entangled | Entangled | Bundle |
| Pore volume | 0.96 | 1.33 | 1.21 | 1.12 | 1.12 | 0.95 | 0.96 | 0.85 | 0.92 | 0.72 | 0.97 |
| Specific surface area | 238.0 | 235.5 | 236.6 | 236.7 | 230.7 | 236 | 219.7 | 190.0 | 190.0 | 183.0 | 253.0 |

TABLE 2-continued

| Classification | Examples | | | | | | | Comparative Examples | | | |
|---|---|---|---|---|---|---|---|---|---|---|---|
| | 1-1 | 1-2 | 1-3 | 1-4 | 1-5 | 1-6 | 1-7 | 1-1 | 1-2 | 1-3 | 1-4 |
| Bulk density | 84.4 | 70.9 | 81.8 | 93.8 | 93.8 | 85.5 | 100 | 73.6 | 85.0 | 95.0 | 24.0 |
| Manufacturing yield | 22.3 | 18.1 | 19.4 | 27.0 | 17 | 13 | 26 | 20.6 | 19.0 | 20.3 | — |
| Volume resistivity | 0.0147 | 0.0164 | 0.0184 | 0.0174 | 0.0184 | 0.0149 | 0.0150 | 0.022 | 0.025 | 0.027 | 0.013 |

Referring to Table 2, the carbon nanotubes of Examples 1-1 to 1-7 and Comparative Examples 1-1 to 1-3 had an entangled-type secondary structural shape, and thus there were insignificant changes in pore volume before/after ball mill treatment. However, the carbon nanotubes of Comparative Example 1-4 had a bundle-type secondary structural shape, and thus there was a significant decrease in pore volume before/after ball mill treatment.

6. Manufacture and Evaluation of Primary Batteries Using the Carbon Nanotubes

1) Manufacture of Pulverized Carbon Nanotubes and Primary Batteries (Lithium-Sulfur Batteries)

Examples 2-1 to 2-6

The carbon nanotubes of Examples 1-1 to 1-6 were pulverized by a ball mill process under the following conditions.
Ball type: Zirconia ball,
Ball diameter: 3 mm,
Ball weight: 1 kg,
Ball rotation speed: 230 rpm,
Ball mill time: 15 minutes
Amount of carbon nanotubes added: 60 g
Container: 2 L PE bottle The pulverized carbon nanotubes and sulfur were mixed by ball milling in a weight ratio of 1:2, and then heat-treated at a temperature of 80° C. to prepare a carbon nanotube-sulfur composite. Styrene-butadiene rubber (SBR) as a binder, carbon black as a conductive material, and the carbon nanotube-sulfur composite were mixed in a weight ratio of 5:20:75 to manufacture a positive electrode. A lithium metal thin film was used as a negative electrode, and an electrolytic solution was injected into a polyethylene separator, thereby completing the manufacture of a coin cell-type primary battery. At this time, the electrolytic solution was prepared by dissolving 0.1 M lithium bis-trifluoromethanesulfonimide (LiTFSI) in an organic solvent consisting of tetraethylene glycol dimethyl ether (TEGDME)/dioxolane (DOL)/dimethyl ether (DME) (volume ratio=1:1:1) and applied to the carbon nanotubes of Examples 1-1 to 1-6, thereby completing the manufacture of respective primary batteries of Examples 2-1 to 2-6 for evaluation.

Example 2-7

The carbon nanotubes of Example 1-7 were pulverized by a ball mill process under the following conditions.
Ball type: Zirconia ball,
Ball diameter: 3 mm,
Ball weight: 1 kg,
Ball rotation speed: 230 rpm,
Ball mill time: 5 minutes
Amount of carbon nanotubes added: 60 g
Container: 2 L PE bottle
A primary battery was manufactured in the same manner as in Example 2-1.

Example 2-8

The carbon nanotubes of Example 1-7 were pulverized by a ball mill process under the following conditions.
Ball type: Zirconia ball,
Ball diameter: 3 mm,
Ball weight: 1 kg,
Ball rotation speed: 230 rpm,
Ball mill time: 15 minutes
Amount of carbon nanotubes added: 60 g
Container: 2 L PE bottle
A primary battery was manufactured in the same manner as in Example 2-1.

Comparative Examples 2-1 to 2-4

Pulverized carbon nanotubes and primary batteries were manufactured in the same manner as in Example 2-1 using the carbon nanotubes of Comparative Examples 1-1 to 1-4.

2) Evaluation of Physical Properties

Experimental Example 2-1: Evaluation of Physical Properties of Pulverized Carbon Nanotubes and Primary Batteries (Lithium-Sulfur Batteries)

Physical properties of the pulverized carbon nanotubes of Examples 2-1 to 2-8 and Comparative Examples 2-1 to 2-4 were evaluated using the same methods as those used in Experimental Example 1-1, and the initial discharge capacity of each of lithium-sulfur batteries as primary batteries was measured under the following conditions and the results thereof are shown in Table 3 below.

(1) Initial discharge capacity (mAh/g): Discharge experiments were carried out at a voltage ranging from 1.5 V to 2.8 V under a condition of 0.1 C, and discharge capacity at 1.5 V was measured.

TABLE 3

| Classification | Examples | | | | | | | | Comparative Examples | | | |
|---|---|---|---|---|---|---|---|---|---|---|---|---|
| | 2-1 | 2-2 | 2-3 | 2-4 | 2-5 | 2-6 | 2-7 | 2-8 | 2-1 | 2-2 | 2-3 | 2-4 |
| Ball mill time (min) | 5 | 5 | 5 | 5 | 5 | 5 | 5 | 15 | 5 | 5 | 5 | 5 |
| Pore volume | 0.97 | 1.34 | 1.24 | 1.22 | 1.13 | 0.96 | 1.1 | 0.93 | 0.83 | 0.90 | 0.74 | 0.72 |
| Specific surface area | 245.0 | — | — | — | — | 243.0 | 220 | 233 | 194.0 | 201.0 | 187.0 | 276.0 |

TABLE 3-continued

| Classification | Examples | | | | | | | | Comparative Examples | | | |
|---|---|---|---|---|---|---|---|---|---|---|---|---|
| | 2-1 | 2-2 | 2-3 | 2-4 | 2-5 | 2-6 | 2-7 | 2-8 | 2-1 | 2-2 | 2-3 | 2-4 |
| Bulk density | 68 | 60 | 67 | 75 | 74 | 69 | — | — | 63 | 69 | 75 | 90 |
| Volume resistivity | — | — | — | — | — | — | 0.012 | 0.012 | — | — | — | — |
| Average pore size | — | — | — | — | — | — | 37.44 | 32.28 | — | — | — | — |
| Volume average particle size | — | — | — | — | — | — | 47 | 20 | — | — | — | — |
| Initial discharge capacity | 1,103 | 1,295 | 1,215 | 1,205 | 1,155 | 1,108 | — | — | 911 | 824 | 789 | 864 |

Referring to Table 3, the carbon nanotubes applied to Examples 2-1 to 2-8 and Comparative Examples 2-1 to 2-3 had an entangled-type secondary structural shape, and thus there were insignificant changes in pore volume before/after ball mill treatment. However, the carbon nanotubes applied to Comparative Example 2-4 had a bundle-type secondary structural shape, and thus there was a significant decrease in pore volume before/after ball mill treatment. The primary batteries of Examples 2-1 to 2-6 use carbon nanotubes having a pore volume of 0.94 cm³/g or more as positive electrodes, and thus the positive electrodes have an excellent carrying capacity. Accordingly, the positive electrodes are capable of sufficiently carrying sulfur, and thus the primary batteries exhibited increased initial discharge capacities.

In addition, as a result of comparing the primary batteries of Examples 2-1 to 2-6, it was confirmed that, the larger the pore volume of the carbon nanotubes after ball mill treatment, the higher the initial discharge capacity of the primary batteries.

Comparing the cases of Examples 2-4 and 2-5 wherein the pore volume and bulk density of the carbon nanotubes were identical to each other, the larger the specific surface area, the lower the volume resistivity, and the pore size was further increased after ball mill treatment and the primary battery exhibited increased initial discharge capacity. From these results, it was confirmed that the specific surface area of the carbon nanotubes also affected the initial discharge capacity of the primary batteries.

Meanwhile, the primary batteries of Comparative Examples 2-1 to 2-3 use carbon nanotubes having a pore volume of less than 0.94 cm³/g as positive electrodes, and thus the positive electrodes exhibit a poor carrying capacity. Accordingly, the positive electrodes were unable to sufficiently carry sulfur, and thus the primary batteries exhibit low initial discharge capacity. It was also confirmed that, in the primary batteries of Comparative Examples 2-1 to 2-3, the pore volume of the carbon nanotubes after ball mill treatment did not have a great impact on the initial discharge capacity of the primary batteries, unlike the primary batteries of the Examples.

Although the primary battery of Comparative Example 2-4 used carbon nanotubes having a pore volume that was equivalent to that of the Examples as a positive electrode, the carbon nanotubes had a bundle-type secondary structural shape, and thus the pore volume was significantly decreased due to the ball mill treatment. Accordingly, the positive electrode was unable to sufficiently carry sulfur when applied to a lithium-sulfur battery, and thus the initial discharge capacity of the lithium-sulfur battery was significantly lowered.

7. Manufacture and Evaluation of Positive Electrodes for Primary Battery

1) Manufacture of Positive Electrodes and Primary Batteries (Lithium-Thionyl Chloride Batteries)

Examples 3-1 to 3-7 and Comparative Examples 3-1 and 3-2

<Manufacture of Positive Electrodes>

A positive electrode active material, a binder, and a solvent were mixed and stirred under component and amount conditions as shown in Table 4 below to prepare a positive electrode composition. The prepared positive electrode composition was coated onto an expanded nickel substrate, followed by vacuum drying at 120° C. and 100 mbar for 240 minutes, thereby completing the manufacture of positive electrodes having a thickness of 0.8 mm.

<Manufacture of Primary Batteries>

Each of the positive electrodes of the Examples and the Comparative Examples, a lithium metal thin film as a negative electrode, and an electrolytic solution (1.25 M) prepared by dissolving an LiAlCl₄ salt in a SOCl₂ solvent were used to manufacture a wound-type battery.

TABLE 4

| Classification | | Examples | | | | | | | Comparative Examples | |
|---|---|---|---|---|---|---|---|---|---|---|
| | | 3-1 | 3-2 | 3-3 | 3-4 | 3-5 | 3-6 | 3-7 | 3-1 | 3-2 |
| (A) Positive electrode active material (Parts by weight) | A-1 | 1 | 0.7 | 0.5 | 0.3 | 1 | — | — | — | — |
| | A-2 | — | — | — | — | — | 0.5 | 0.3 | — | — |
| | A-3 | — | 0.3 | 0.5 | 0.7 | — | 0.5 | 0.7 | 1 | 0.3 |
| | A-4 | — | — | — | — | — | — | — | — | 0.7 |
| (B) Binder (Parts by weight) | | 0.8 | 0.8 | 0.8 | 0.8 | 0.405 | 0.8 | 0.8 | 0.8 | 0.8 |

TABLE 4-continued

|  | Classification |  | Examples | | | | | | | Comparative Examples | |
|---|---|---|---|---|---|---|---|---|---|---|---|
|  |  |  | 3-1 | 3-2 | 3-3 | 3-4 | 3-5 | 3-6 | 3-7 | 3-1 | 3-2 |
| (C) Solvent | C-1 | | 5.2 | 5.2 | 5.2 | 5.2 | 5.2 | 5.2 | 5.2 | 5.2 | 5.2 |
| (Parts by weight) | C-2 | | 2.1 | 2.1 | 2.1 | 2.1 | 2.1 | 2.1 | 2.1 | 2.1 | 2.1 |

(A-1) Pulverized carbon nanotubes of Example 2-7
(A-2) Pulverized carbon nanotubes of Example 2-8
(A-3) Acetylene black (AB): SB50L available from Denka
(A-4) Ketjen black (KB): EC300IJ available from LION
(B) PTFE-D available from DAIKIN (polytetrafluoroethylene, PTFE)
(C-1) Isopropyl alcohol (IPA)
(C-2) Water 2) Evaluation of Positive Electrode Compositions, Positive Electrodes, and Primary Batteries (Lithium-Thionyl Chloride Batteries)

Experimental Example 3-1

Physical properties of the positive electrode compositions, the positive electrodes, and the primary batteries, according to the Examples and the Comparative Examples, were measured using the methods as described below, and the results thereof are shown in Table 5 below.

(1) Volume resistivity ($\Omega$.cm): measured using MCP-PD51 available from N&H Technology GmbH. Specifically, 0.4 g of each positive electrode composition was put in a cylindrical sample cell having a diameter of 1 cm at 25° C., and then the pressure was sequentially raised to 4 kN (12.73 MPa), 8 kN (25.46 MPa), 12 kN (38.20 MPa), 16 kN (50.93 MPa), and 20 kN (63.66 MPa), and the thickness of the positive electrode composition was 0.1 cm when the pressure was at 20 kN (63.66 MPa), and a potential difference, current, and resistance at this time were measured, which were then applied to the equation to obtain volume resistivity. In addition, volume resistivity at a density of 1 g/cc was calculated using a trend line.

(2) Specific surface area ($m^2/g$): measured in the same manner as in Experimental Example 1-1.

(3) Pore volume ($cm^3/g$): measured in the same manner as in Experimental Example 1-1.

(4) Average pore size (nm): measured in the same manner as in Experimental Example 1-1.

(5) Thickness (mm): measured using a Vernier caliper (6) Whether or not cracks were formed: the surface of each positive electrode was photographed using an optical microscope.

×: no cracks, ○: cracks formed (7) Discharge time (sec): Current density conditions were as follows: after an initial rest period of 30 seconds (30 seconds at 1 A→rest period of 30 seconds→600 seconds at 0.25 A→rest period of 30 seconds→300 seconds at 0.6 A), and this process was repeated to conduct discharge experiments up to the final voltage (2.0 V), thereby measuring discharge time.

(8) Discharge capacity (mAh/g): Discharge experiments were carried out on each primary battery at a current density of 0.6 A and a constant current up to the final voltage (2.0 V), thereby measuring discharge capacity.

TABLE 5

|  | Classification | Examples | | | | | | | Comparative Examples | |
|---|---|---|---|---|---|---|---|---|---|---|
|  |  | 3-1 | 3-2 | 3-3 | 3-4 | 3-5 | 3-6 | 3-7 | 3-1 | 3-2 |
|  | Volume resistivity | 0.0191 | 0.0185 | 0.0313 | 0.0316 | — | — | 0.0185 | 0.0414 | 0.0281 |
| Positive electrode | Specific surface area | 166 | 122 | 114 | 77 | — | — | 77 | 43 | 178 |
|  | Pore volume | 1.06 | 0.69 | 0.55 | 0.37 | — | — | 0.29 | 0.14 | 0.34 |
|  | Average pore size | 23.4 | 20.7 | 19.5 | 18.1 | — | — | 14.0 | 13.0 | 8.4 |
|  | Thickness (mm) | 0.8 | 0.8 | — | — | 0.8 | 0.8 | — | 0.8 | 0.8 |
|  | Occurrence of cracks | x | x | x | x | x | x | x | x | x |
| Primary battery | Discharge time | 11,030 | 11,020 | — | — | 11,305 | 10,069 | — | 8,650 | 9,142 |
|  | Discharge capacity | 1,047 | 1,040 | — | — | 1,085 | 1,035 | — | 927 | 1,026 |

Referring to Table 5, the positive electrodes for a primary battery of Examples 3-1 to 3-7 have larger pore volumes and larger average pore sizes than those of the positive electrodes for a primary battery of Comparative Examples 3-1 and 3-2, and thus the ability of the positive electrodes to carry sulfur is excellent. From the results, it was confirmed that the primary batteries of the Examples exhibited a significantly enhanced discharge time and discharge capacity.

Meanwhile, the positive electrode for a primary battery of Comparative Example 3-1 has a small pore volume, and thus the ability thereof to carry sulfur is not good. Accordingly, the positive electrode was unable to sufficiently carry sulfur, and thus the primary battery exhibited low discharge capacity and a short discharge time.

In addition, the positive electrode for a primary battery of Comparative Example 3-2 has a small average pore size although having an appropriate pore volume, and thus the ability thereof to carry sulfur is not good. Accordingly, since the positive electrode was unable to sufficiently carry sulfur, the primary battery exhibited low discharge capacity and a short discharge time.

The invention claimed is:

1. Carbon nanotubes having a pore volume of 0.95 cm$^3$/g or morcto 2.0 cm$^3$/g, a specific surface area of 200 m$^2$/g to 300 m$^2$/g, and being an entangled type.

2. The carbon nanotubes of claim 1, wherein the carbon nanotubes have a volume resistivity of 0.0187 Ω·cm or less at a temperature of 25° C. and a pressure of 20 kN.

3. A method of manufacturing carbon nanotubes, the method comprising:
    allowing a mixture comprising a main catalyst precursor and a co-catalyst precursor to be supported on γ-Al$_2$O$_3$ to prepare an active carrier;
    drying the active carrier through multi-stage drying comprising vacuum drying, wherein the vacuum drying comprises primary vacuum drying and secondary vacuum drying, wherein the primary vacuum drying is performed at a first temperature and the secondary vacuum drying is performed at a second temperature that is higher than the first temperature;
    heat-treating the dried active carrier to prepare a supported catalyst; and
    manufacturing carbon nanotubes in the presence of the supported catalyst.

4. The method of claim 3, wherein the multi-stage drying comprises ambient pressure drying and vacuum drying.

5. The method of claim 4, wherein the ambient pressure drying is performed at a temperature ranging from 80° C. to 160° C.

6. The method of claim 4, wherein the vacuum drying is performed at a temperature ranging from 80° C. to 300° C. and a pressure ranging from 1 mbar to 200 mbar.

7. The method of claim 3, wherein the first temperature ranges from 80° C. to 160° C., and the second temperature ranges from 175° C. to 300° C.

8. The method of claim 3, wherein a co-catalyst comprises one or more selected from the group consisting of vanadium and molybdenum.

9. The method of claim 8, wherein the mixture comprises the co-catalyst precursor such that a molar ratio of a sum of vanadium and molybdenum to vanadium ranges from 1:0.45 to 1:0.95.

10. A positive electrode for a primary battery, the positive electrode comprising:
    a positive electrode active material comprising carbon nanotubes having a pore volume of 0.95 cm$^3$/g to 2.0 cm$^3$/g, a specific surface area of 200 m$^2$/g to 300 m$^2$/g, and being an entangled type; and
    a binder.

11. The positive electrode of claim 10, wherein the positive electrode for a primary battery has a pore volume of 0.25 cm$^3$/g or more and an average pore size of 13.5 nm or more.

12. The positive electrode of claim 10, wherein the positive electrode for a primary battery has a specific surface area of 60 m$^2$/g to 200 m$^2$/g.

13. The positive electrode of claim 10, wherein the carbon nanotubes have a volume resistivity of 0.0187 Ω·cm or less at a temperature of 25° C. and a pressure of 20 kN.

14. A primary battery comprising the positive electrode according to claim 10.

* * * * *